(12) United States Patent
Li (10) Patent No.: US 8,641,187 B2
(45) Date of Patent: Feb. 4, 2014

(54) ROTARY GLASSES

(75) Inventor: Hsing-Chen Li, Tainan (TW)

(73) Assignee: High Rainbow Ent, Co., Ltd., Tainan (TW)

( * ) Notice: Subject to any disclaimer, the term of this patent is extended or adjusted under 35 U.S.C. 154(b) by 120 days.

(21) Appl. No.: 13/483,649

(22) Filed: May 30, 2012

(65) Prior Publication Data

US 2013/0010254 A1    Jan. 10, 2013

(30) Foreign Application Priority Data

Jul. 5, 2011 (TW) .............................. 100123790 A (51) Int. Cl.
*G02C 5/08* (2006.01)
(52) U.S. Cl.
USPC ............. 351/63; 351/110; 351/116; 351/153; 16/228; 2/454
(58) Field of Classification Search
USPC ............ 351/63, 116, 110, 153, 11, 41; 2/454; 16/228
See application file for complete search history.

(56) References Cited

U.S. PATENT DOCUMENTS

| 6,428,166 B2* | 8/2002 | Tiberghien | 351/153 |
| 7,553,015 B2* | 6/2009 | Vittorio | 351/110 |
| 7,992,995 B2* | 8/2011 | Jacquemin | 351/63 |
| 8,070,287 B1* | 12/2011 | Wang-Lee | 351/120 |

\* cited by examiner

*Primary Examiner* — Hung Dang
(74) *Attorney, Agent, or Firm* — Wang Law Firm, Inc.; Li K. Wang; Stephen Hsu (57) ABSTRACT

A pair of rotary glasses comprising a lens, a glasses leg, and a pivot element. The support portion includes a second pivot portion corresponding to the first pivotal transverse through hole. The pivot element is passed through the first pivotal transverse through hole and the second pivot portion to pivotally couple each glasses leg. With this structural design, a user can longitudinally rotate the support portion by using the pivot element as an axis towards or away from the upper edge of the lens or the glasses frame so that the folding portion of the glasses leg and the lens or the glasses frame can support the rotary glasses on a disposing surface securely. Therefore, the rotary glasses will not lose balance or topple over by a slight external force so as to prevent the lens or the glasses frame from damage.

10 Claims, 14 Drawing Sheets

ROTARY GLASSES

CROSS-REFERENCE TO RELATED APPLICATION

This application claims the benefit of Taiwan Patent Application No. 100123790, filed on Jul. 5, 2011, in the Taiwan Intellectual Property Office, the disclosure of which is incorporated herein by reference.

FIELD OF THE INVENTION

The present invention relates to rotary glasses, more particularly to the rotary glasses with a sufficient support force so as to be set on a setting surface securely.

BACKGROUND OF THE INVENTION

A pair of glasses is a common vision correction tool. In general, lenses are embedded into a glasses frame of the glasses and provided for a wearer to wear in front of the wearer's eyes to improve vision, protect eyes, or serve as a decoration. The glasses frame generally includes a pair of glasses legs extended backwardly, such that when a wearer wants to wear the glasses, each glasses leg is set respectively on each ear on both sides of the wearer' cheek, so that the lenses are mounted in front of the wearer's eyes. If the user does not wear the glasses, the glasses legs on the wearer's ears are removed, and then each glasses leg is folded in order to store the glasses.

Figure 1:
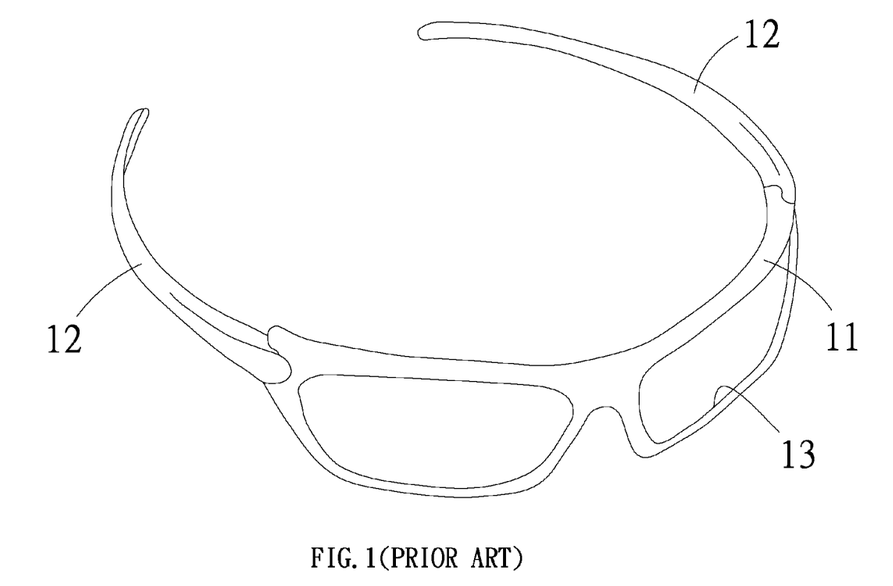
FIG. 1 is a schematic view of a pair of conventional framed glasses.
Figure 2:
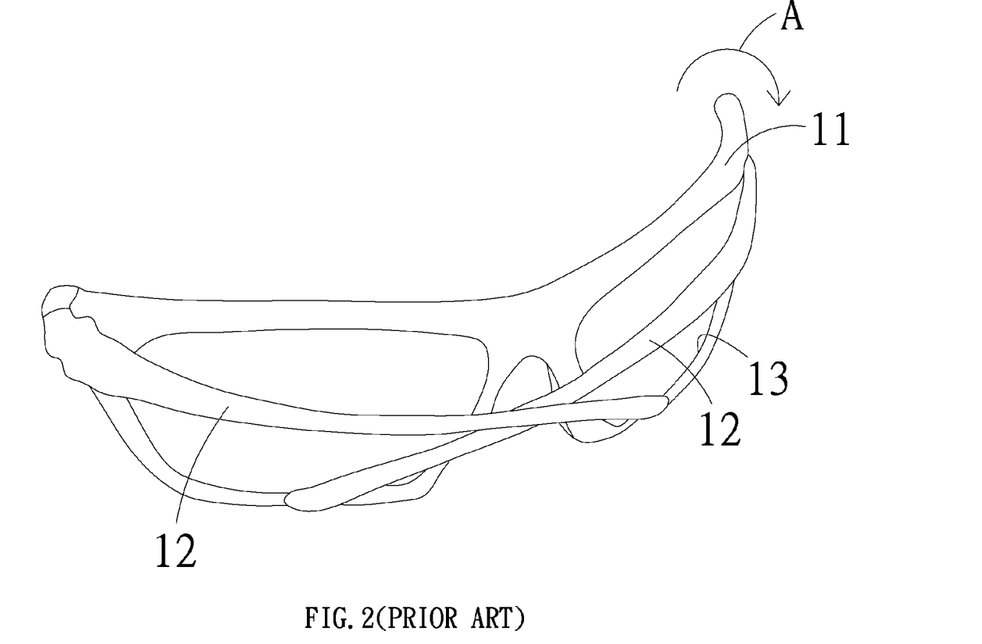
FIG. 2 is a schematic view of folding glasses legs of a pair of conventional framed glasses.
Figure 3:
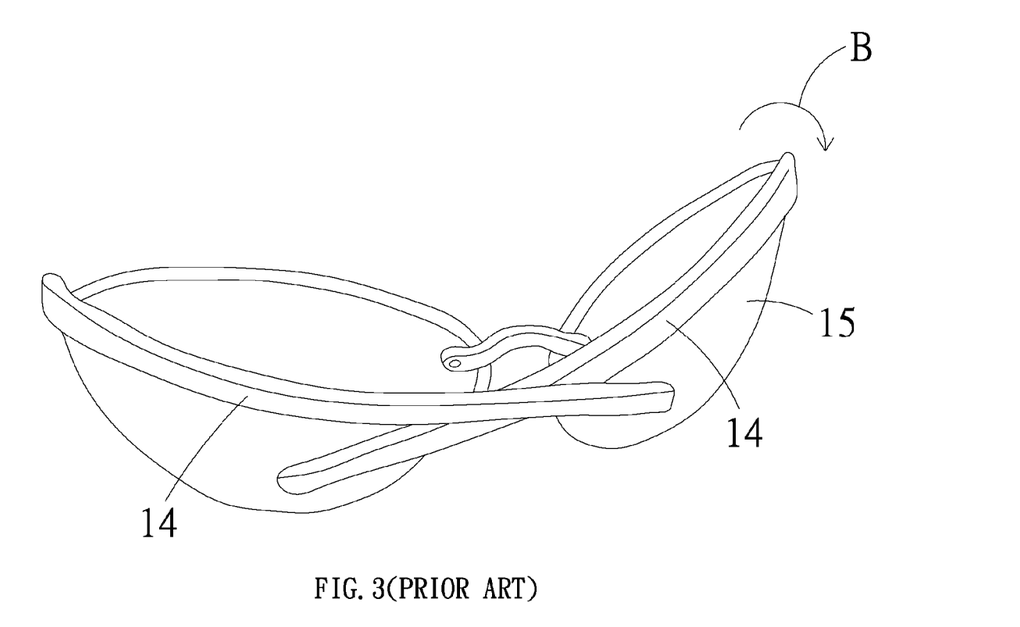
FIG. 3 is a schematic view of folding glasses legs of a pair of conventional frameless glasses.

With reference to FIG. 1 for a schematic view of a pair of conventional framed glasses, the pair of conventional framed glasses comprises a frame 11 and two glasses legs 12, and the frame 11 includes two embedding holes 13 for embedding two corresponding lenses, and each glasses leg 12 is installed at upper edges on left and right sides of the frame 11 respectively. With reference to FIG. 2 for a schematic view of folding glasses legs of a pair of conventional framed glasses, if a user does not wear the glasses, each glasses leg 12 can be folded by a rotating method to the front of the glasses frame 11 in order to store the glasses, wherein the glasses leg 12 is turned in a rotating direction as indicated by the arrow A in the figure. With reference to FIG. 3 for a schematic view of folding a glasses leg of a pair of conventional frameless glasses, each glasses leg 14 of the frameless glasses is disposed on upper edges on left or right side of each lens 15 respectively. Similarly, the glasses leg 14 is folded in a rotating direction as indicated by the arrow B in the figure, so that each glasses leg 14 can be folded to the front of the lens 15 by the rotating method to facilitate the storage of the frameless glasses.

However, after the glasses leg disposed at upper edges on left or right sides of the frame or lens is folded forward, only the glasses frame or lens is provided for supporting the glasses on a disposing surface, so that the glasses may lose balance and topple over due to a slight external force such as a user touches the glasses frame or lens by accident. In other words, the supporting force of the glasses supporting force is insufficient and the glasses cannot be set on the disposing surface securely. When the glasses topple over, it may wear or damage the lens easily.

In addition, the conventional glasses are limited by the size of the wearer's head. For example, a user with a larger head requires a wider glasses frame, and a wearer with a small head requires a narrower glasses frame. Further, the conventional inwardly leg bent and folded glasses occupies a larger volume when it is stored, so that the disposing space cannot be saved when several glasses are stacked with one another. Obviously, the aforementioned conventional glasses require improvements.

SUMMARY OF THE INVENTION

In view of the shortcomings of the prior art, the inventor of the present invention based on years of experience in the related industry to conduct extensive researches and experiments, and finally developed a pair of novel rotary glasses to overcome the aforementioned drawbacks of the prior art.

It is a primary objective of the present invention to provide a pair of rotary glasses with a sufficient supporting force.

Another objective of the present invention is to provide a pair of rotary glasses that will not lose balance or topple over due to eternal factors.

A further objective of the present invention is to provide a pair of rotary glasses with a support portion of a glasses leg such that a user can longitudinally rotate the glasses leg by using a pivot element as an axis in a direction away from or towards an upper edge of a lens on demand.

To achieve the aforementioned objective, the present invention provides a pair of rotary glasses, comprising a lens, a glasses leg and a pivot element. A first pivotal transverse through hole formed on a non-upper edge of both left and right sides of each lens respectively. The glasses leg includes a support portion and a folding portion coupled with each other, and a second pivot portion disposed at an end of the support portion and corresponding to the first pivotal transverse through hole. The pivot element is optionally integrally formed with the glasses leg. If the pivot element is not integrally formed with the glasses leg, the pivot element is transversely passed through the first pivotal transverse through hole and the second pivot portion to pivotally couple the lens and the glasses leg with each other. If the pivot element is integrally formed with the glasses leg, the pivot element is transversely passed through the first pivotal transverse through hole to pivotally couple the glasses leg and the lens with each other.

To achieve the aforementioned objective, the present invention provides a pair of rotary glasses comprising a glasses frame, a glasses leg and a pivot element. A first pivotal transverse through hole is respectively formed on a non-upper edge of both left and right sides of each lens. The glasses leg includes a support portion and a folding portion coupled with each other, and the support portion has a second pivot portion disposed at an end of the support portion and corresponding to the first pivotal transverse through hole. The pivot element and the glasses leg are optionally integrally formed with each other. If the pivot element is not integrally formed with the glasses leg, the pivot element transversally is passed through the first pivotal transverse through hole and the second pivot portion to pivotally couple the glasses frame and the glasses leg with each other. If the pivot element and the glasses leg are integrally formed with each other, the pivot element transversally is passed through the first pivotal transverse through hole to pivotally couple the glasses leg and the glasses frame with each other.

With the overall structural design of the rotary glasses according to the present invention, a user can rotate the support portion of the glasses leg by using the pivot element as an axis in a direction towards or away from the upper edge of the lens or the glasses frame longitudinally, so that the folding portion of the glasses leg and the lens or the glasses frame can support the rotary glasses at the same time, such that the rotary glasses can be disposed on the disposing surface securely by the sufficient supporting force. Therefore, the rotary glasses of the present invention will not lose balance or topple over by a slight external force so as to prevent the lens or the glasses frame from damage.

DESCRIPTION OF THE PREFERRED EMBODIMENTS

The technical characteristics of the present invention will become apparent with the detailed description of the preferred embodiments accompanied with the illustration of related drawings as follows. It is noteworthy that same numerals are used for representing the same respective elements in the drawings.

Figure 4A:
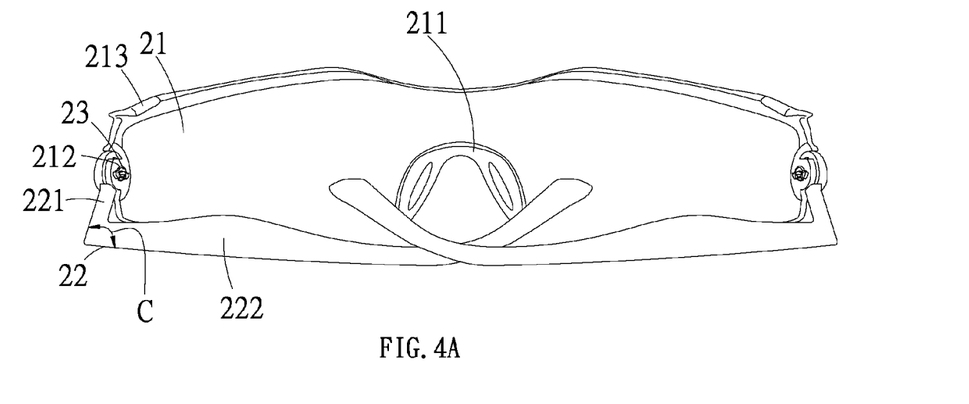
FIG. 4A is a schematic view of a pair of rotary glasses in accordance with a first preferred embodiment of the present invention.
Figure 4B:
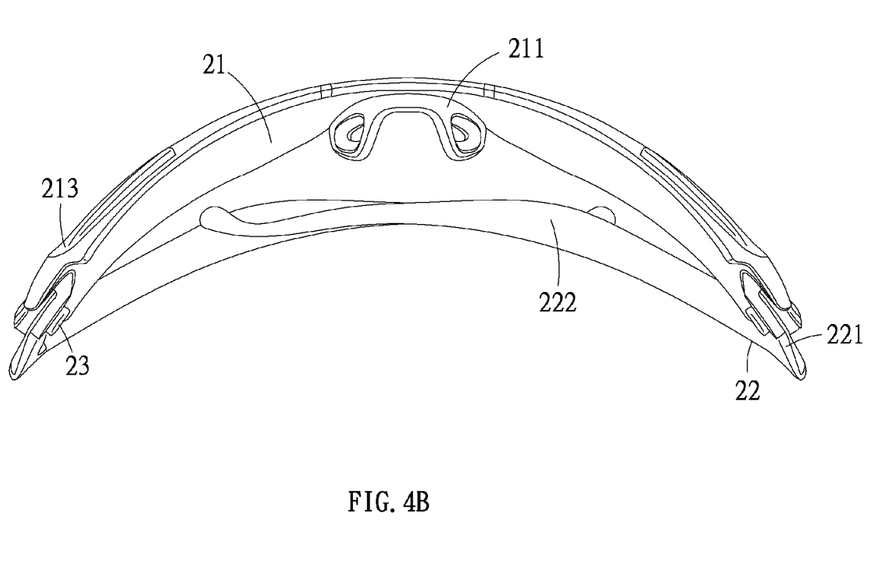
FIG. 4B is a top view of a pair of rotary glasses in accordance with the first preferred embodiment of the present invention.
Figure 5:
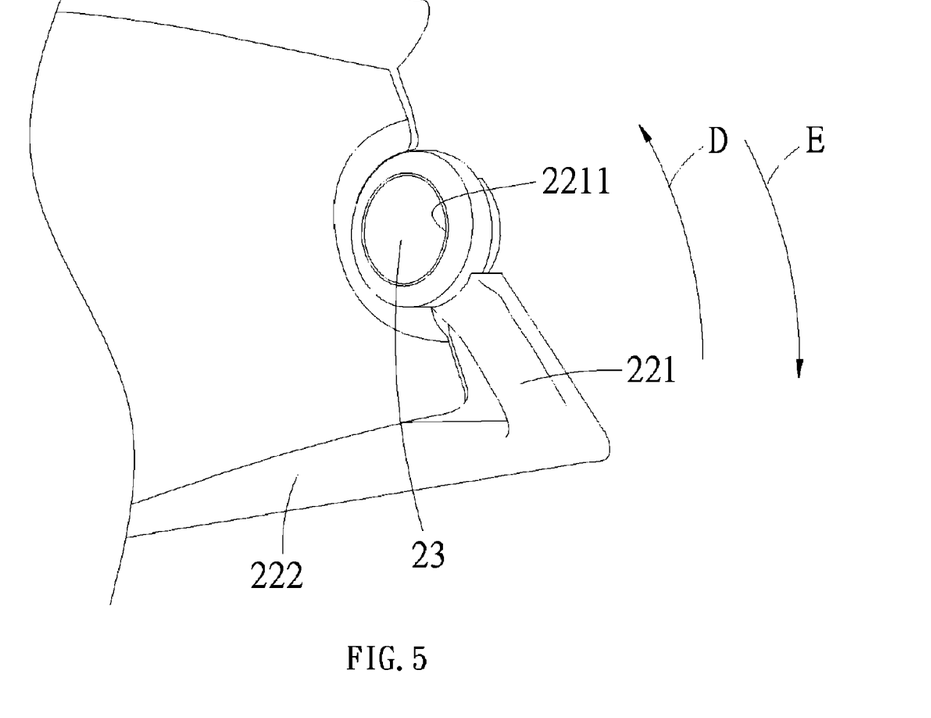
FIG. 5 is a schematic view of a rotating direction of glasses legs of a pair of rotary glasses in accordance with the first preferred embodiment of the present invention.

With reference to FIGS. 4A and 4B for a schematic view and a top view of a pair of rotary glasses in accordance with the first preferred embodiment of the present invention respectively, the pair of rotary glasses comprises at least one lens 21, at least one glasses leg 22 and at least one pivot element 23. The lens 21 can be an integrally formed lens 21. A nose rest portion 211 is concavely formed at the middle of the lens 21. A first pivotal transverse through hole 212 is formed respectively at a non-upper edge of both left and right sides of the lens 21, such as a position proximate to or situated at the middle of both left and right sides of the lens 21. Each glasses leg 22 includes a support portion 221 and a folding portion 222 coupled with each other. The support portion 221 and the folding portion 222 are extended in different directions to define an angle of intersection C. The support portion 221 and the folding portion 222 can be integrally formed. The support portion 221 has a second pivot portion 2211 disposed at an end of the support portion 221 and corresponding to the first pivotal transverse through hole 212. In FIG. 5, the pivot element 23 is passed through the first pivotal transverse through hole 212 and the second pivot portion 2211 to pivotally couple the lens 21 and glasses leg 22 with each other. A recessed portion 213 is concavely formed on both left and right sides of the upper edge of the lens 21 respectively for snapping in the support portion 221 of the glasses leg 22.

With reference to FIG. 5 for a schematic view of a rotating direction of glasses legs of a pair of rotary glasses in accordance with the first preferred embodiment of the present invention, when a user wants to wear the rotary glasses of the present invention, the pivot element 23 can be used as an axis to let a user rotate the support portion 221 of the glasses leg 22 in a direction toward the upper edge of the lens 21. The aforementioned rotating direction is indicated by the arrow D in the FIG. 5.

Figure 6A:
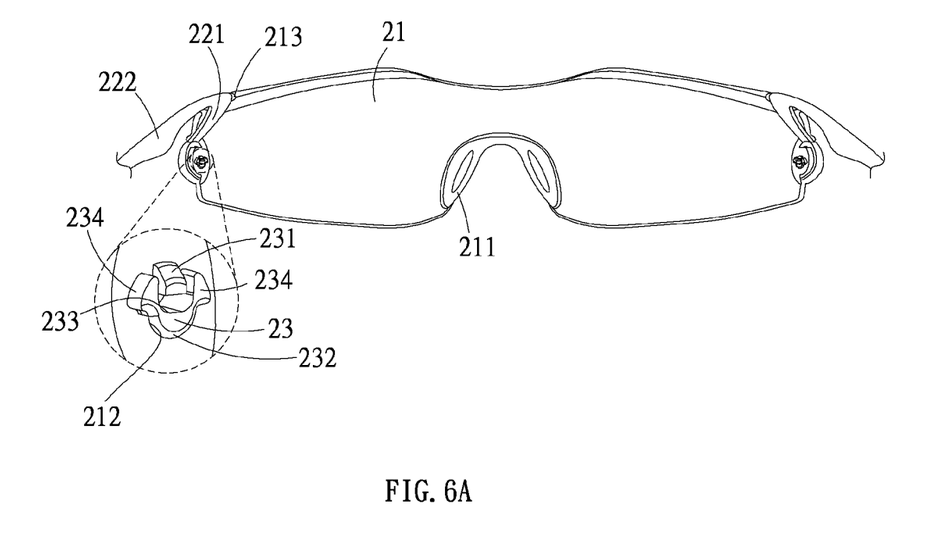
FIG. 6A is a schematic view of a using status of a pair of rotary glasses in accordance with the first preferred embodiment of the present invention.
Figure 6B:
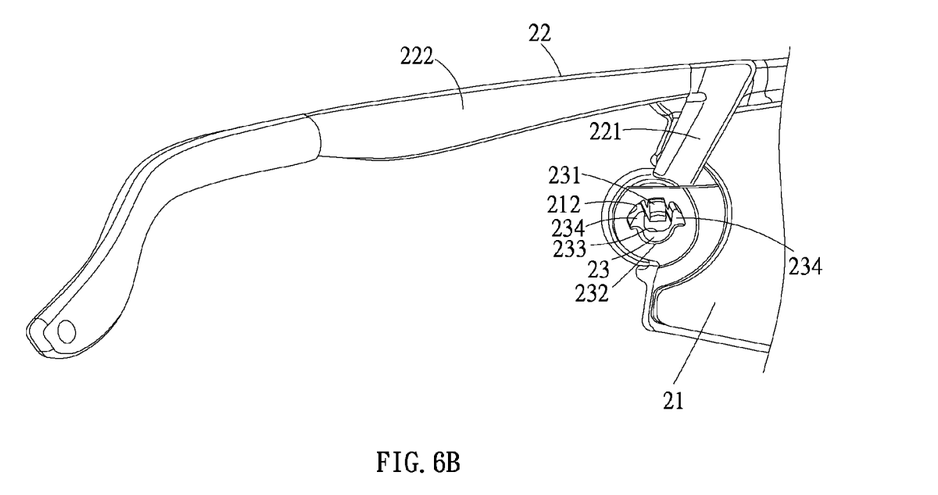
FIG. 6B is a partial schematic view of an unfolding status of a pair of rotary glasses in accordance with the first preferred embodiment of the present invention.

With reference to FIGS. 6A and 6B for FIG. 6A for a schematic view of a using status of a pair of rotary glasses in accordance with the first preferred embodiment of the present invention and a partial schematic view of an unfolding status of a pair of rotary glasses in accordance with the first preferred embodiment of the present invention respectively, after the user rotates the support portion 221 of the glasses leg 22 in a direction towards the upper edge of the lens 21 so that the support portion 221 can further be snapped into the recessed portion 213 at the upper edge of the lens 21. Accordingly, the user can wear the rotary glasses.

Similarly, if the user does not want to wear the rotary glasses of the present invention, the pivot element 23 can be used as an axis to let the user to rotate the support portion 221 of the glasses leg 22 in a direction away from the upper edge of the lens 21. The aforementioned rotating direction is indicated by the arrow E in FIG. 5. Therefore, the folding portion 222 of the glasses leg 22 and the lens 21 can support the rotary glasses at the same time such that the rotary glasses can be disposed on a disposing surface. Therefore, the rotary glasses can obtain sufficient supporting force to be disposed securely on the disposing surface.

Figure 7A:
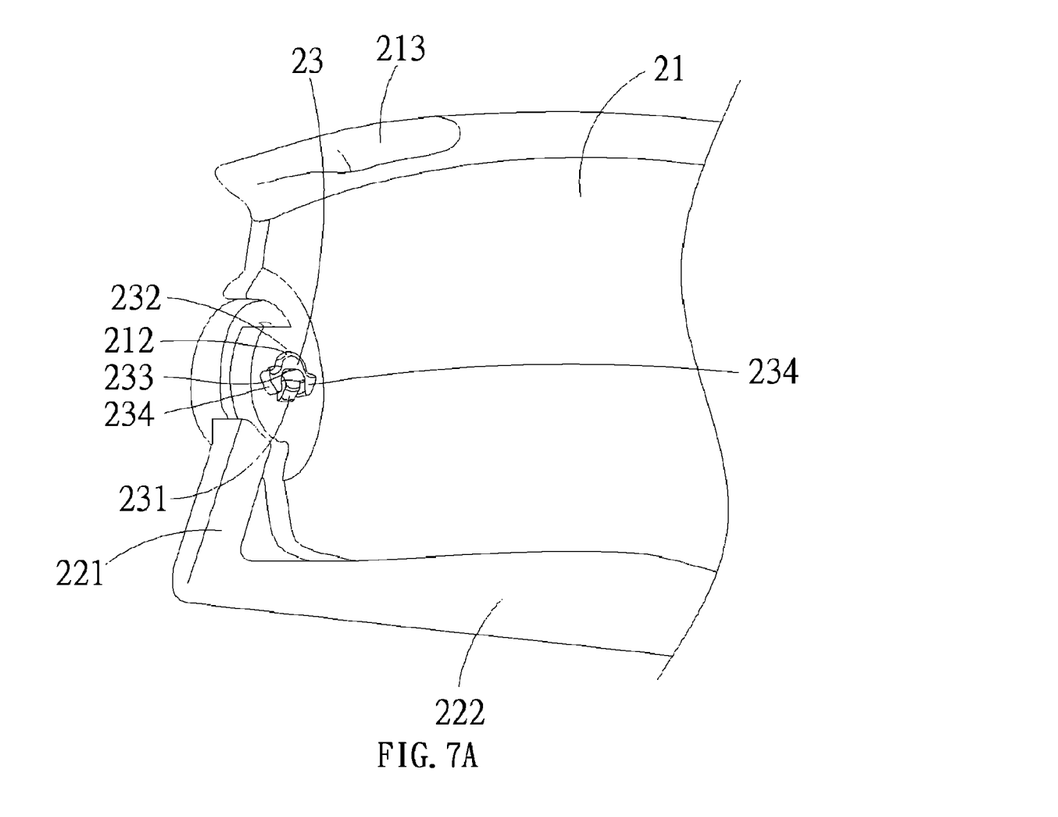
FIG. 7A is a partial schematic view of a folding status of a pair of rotary glasses in accordance with the first preferred embodiment of the present invention.
Figure 7B:
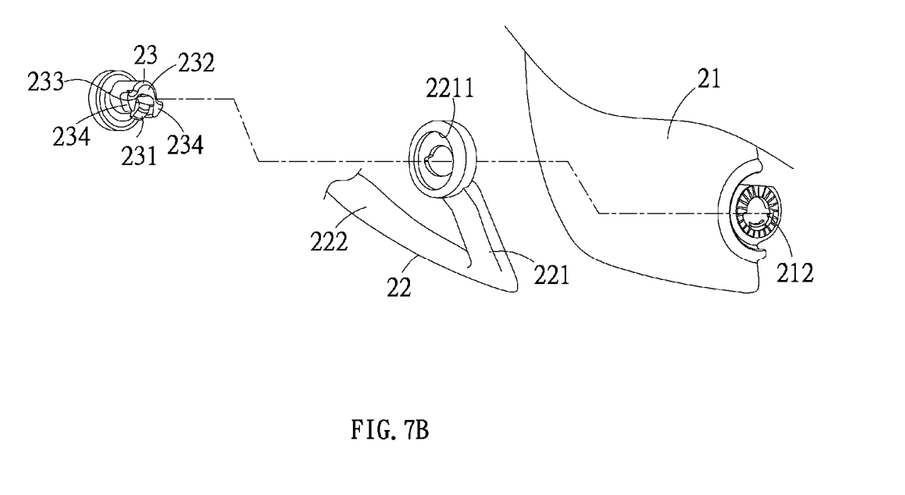
FIG. 7B is a partial exploded view of a pair of rotary glasses in accordance with the first preferred embodiment of the present invention.

With reference to FIGS. 7A and 7B for a partial schematic view of a folding status of a pair of rotary glasses in accordance with the first preferred embodiment of the present invention and a partial exploded view of a pair of rotary glasses in accordance with the first preferred embodiment of the present invention respectively, the pivot element 23 is passed through the second pivot portion 2211 and the first pivotal transverse through hole 212 sequentially, and the pivot element 23 has a snap portion 231 and a latch portion 232 disposed at an end of the pivot element 23, and the latch portion 232 includes a recessed position 233 and two symmetric snap members 234, and the snap portion 231 is disposed at the recessed position 233, such that each snap members 234 can be disposed precisely on both sides of the snap portion 231. The snap portion 231 is passed through the second pivot portion 2211 first and then elastically be pressed to pass through the first pivotal transverse through hole 212, and finally protruded and latched to the external periphery of the first pivotal transverse through hole 212 of the lens 21 to pivotally couple the lens 21 and the glasses leg 22 with each other.

Figure 8A:
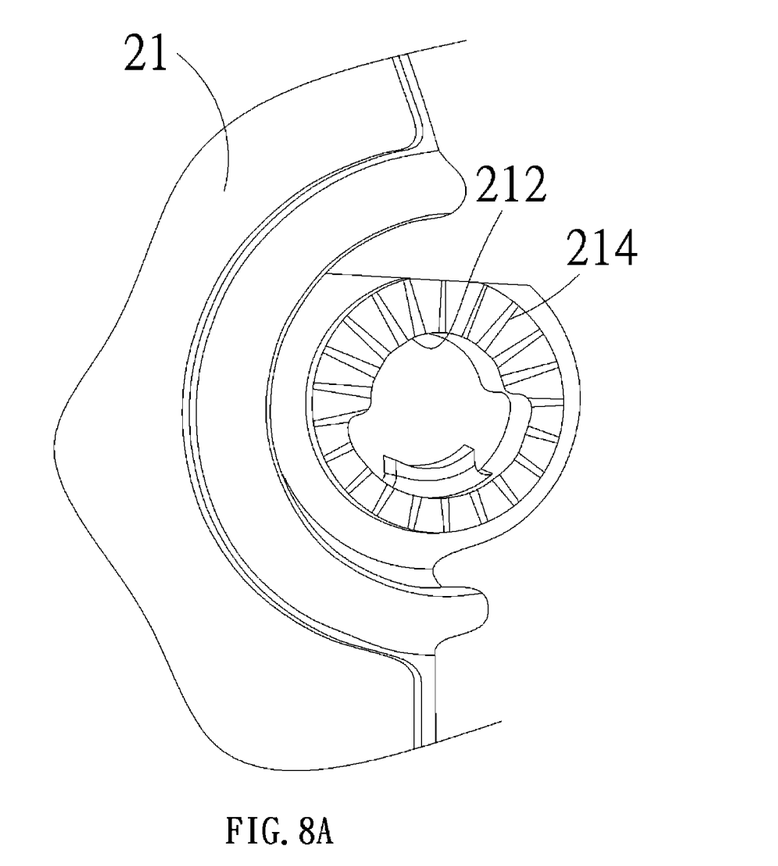
FIG. 8A is a partial exploded view of a first pivotal transverse through hole of a pair of rotary glasses in accordance with the first preferred embodiment of the present invention.
Figure 8B:
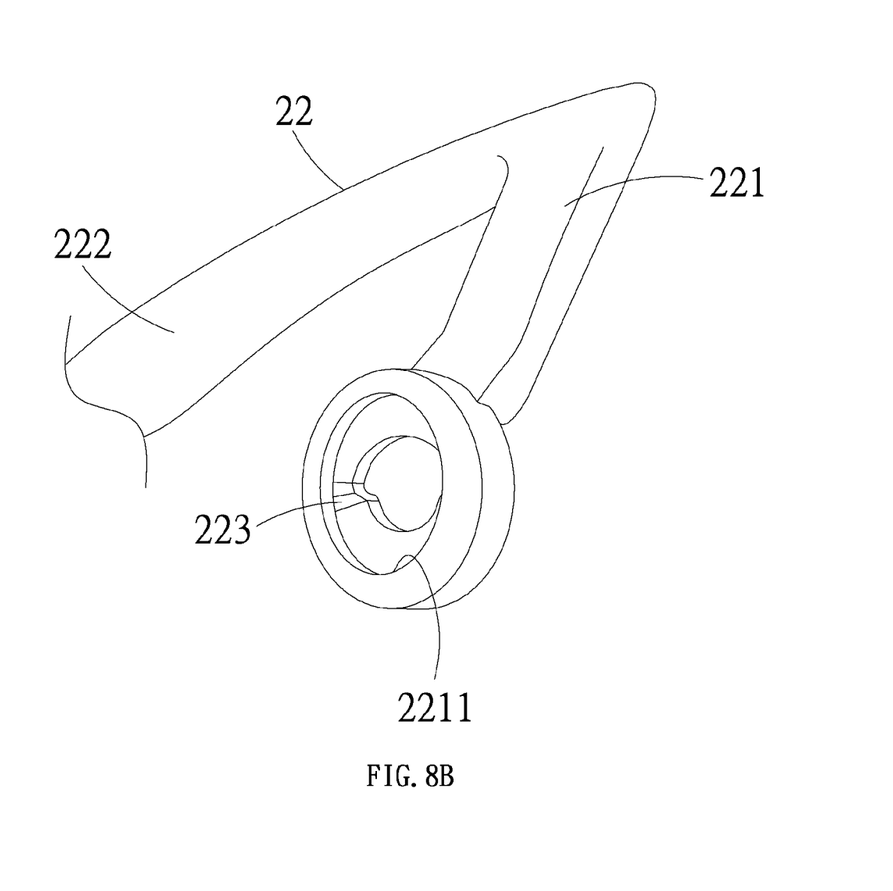
FIG. 8B is a schematic view of a second pivot portion of a pair of rotary glasses in accordance with the first preferred embodiment of the present invention.

With reference to FIGS. 8A and 8B for schematic views of a first pivotal transverse through hole and a second pivot portion of a pair of rotary glasses in accordance with the first preferred embodiment of the present invention respectively, it is noteworthy that the lens 21 includes a plurality of recessions 214 disposed around and coupled to the first pivotal transverse through hole 212, and the glasses leg 22 includes a protrusion 223 having a shape corresponding to the recession 214, so that when the pivot element 23 is passed through the second pivot portion 2211 and the first pivotal transverse through hole 212, the protrusion 223 can be snapped into the recession 214 to achieve a specific effect, such as installing the second pivot portion 2211 and the first pivotal transverse through hole 212 more tightly with each other. The aforementioned structural design is provided as an example to illustrate the invention, but the invention is not limited to such design only.

Figure 9:
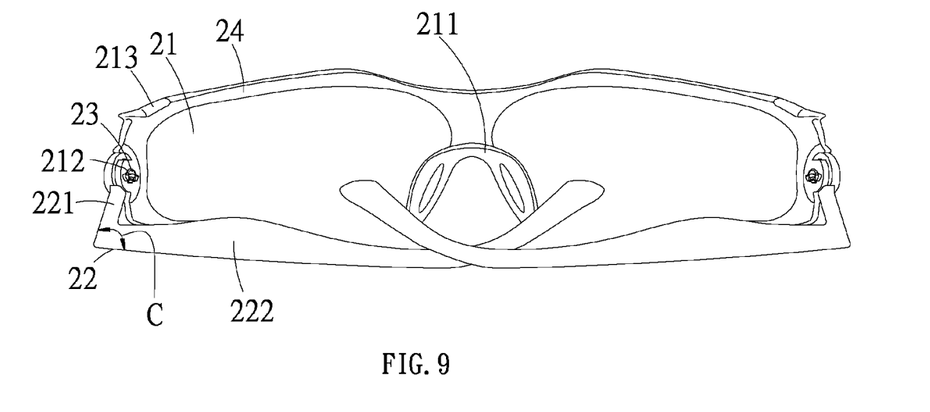
FIG. 9 is a schematic view of a pair of rotary glasses in accordance with a second preferred embodiment of the present invention.

With reference to FIG. 9 for a schematic view of a pair of rotary glasses in accordance with the second preferred embodiment of the present invention, the rotary glasses comprises a glasses frame 24, at least one glasses leg 22 and at least one pivot element 23. The glasses frame 24 includes two lenses 21 mounted thereon. A nose rest portion 211 is concavely formed at the middle of the glasses frame 24. first pivotal transverse through hole 212 is respectively formed at a non-upper edge on both left and right sides of the glasses frame 24, such as a position proximate to or situated at the middle of both left and right sides of the glasses frame 24. The glasses leg 22 includes a support portion 221 and a folding portion 222, and the support portion 221 and the folding portion 222 are coupled to each other. The support portion 221 and the folding portion 222 are extended in different directions to define an angle of intersection C. The support portion 221 and the folding portion 222 can be integrally formed. The support portion 221 includes a second pivot portion 2211 formed at an end of the support portion 221 and corresponding to the first pivotal transverse through hole 212. The pivot element 23 is transversally passed through first pivotal transverse through hole 212 and the second pivot portion 2211 to pivotally couple the glasses frame 24 and the glasses leg 22 with each other. A recessed portion 213 is concavely formed on both left and right sides of the upper edge of the glasses frame 24 respectively for snapping in the support portion 221 of the glasses leg 22. The pivot element 23 includes a snap portion 231 and a latch portion 232 disposed at an end of the pivot element 23, and the latch portion 232 includes a recessed position 233 and two symmetric snap members 234, and the snap portion 231 is disposed at the recessed position 233, such that each snap member 234 is precisely situated on each of the both sides of the snap portion 231.

With reference to FIGS. 8A and 8B again, similarly the glasses frame 24 includes a plurality of recessions 214 disposed around the first pivotal transverse through hole 212 and the glasses leg 22 includes a protrusion 223 having a shape corresponding to the recession 214, such that when the pivot element 23 is passed through the second pivot portion 2211 and the first pivotal transverse through hole 212, the protrusion 223 can be snapped into the recession 214.

Figure 10:
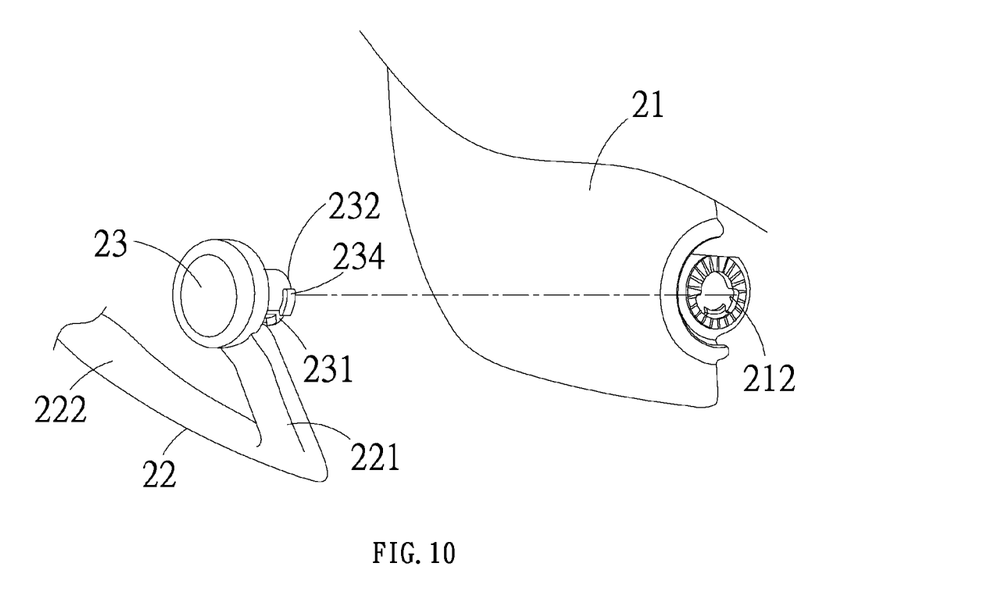
FIG. 10 is a schematic view of another form of a pair of rotary glasses in accordance with the first or second preferred embodiment of the present invention.

With reference to FIG. 10 for a schematic view of another form of a pair of rotary glasses in accordance with the first or second preferred embodiment of the present invention, the rotary glasses of the first preferred embodiment or the second preferred embodiment comprise the glasses leg 22 and the pivot element 23 integrally formed. For example, the pivot element 23 is integrally formed in an injection molding process and be passed through the second pivot portion 2211 of the glasses leg 22. After the pivot element 23 is transversally passed through the first pivotal transverse through the hole 212, the glasses leg 22 and the lens 21, or the glasses leg 22 and the glasses frame 24 are pivotally coupled with each other.

It is noteworthy to point out that when the rotary glasses is in a folded state, the snap portion 231 of the pivot element 23 and the lens 21 or the glasses frame 24 are snapped with each other, the snap portion 231 of the pivot element 23 and the lens 21 or the glasses frame 24 are latched with each other. When the glasses leg 22 of the rotary glasses is rotated, the snap member 234 of the latch portion 232 of the pivot element 23 is further latched with the lens 21 or the glasses frame 24, so that the glasses leg 22 and the lens 21 or the glasses leg 22 and glasses frame 24 are pivotally and closely coupled with each other.

It is noteworthy to point out that the method of using the rotary glasses in accordance with the second preferred embodiment the present invention is the same as the first preferred embodiment, and the user can rotate the support portion 221 of the glasses leg 22 in a direction towards or away from the upper edge of the glasses frame 24, and the glasses leg 22 of the rotary glasses can be made of nylon, and the lens 21 and the pivot element 23 can be made of polycarbonate. Since these are not the key points of the present invention, and thus will not be described in details.

It is noteworthy to point out that the second pivot portion 2211 of the rotary glasses of the present invention comes with a foolproof polygonal hole structural design having a shape corresponding to the shape of the snap portion 231 and the latch portion 232 of the pivot element 23. The polygonal hole can be changed to a triangular hole, a square hole or an irregular shaped hole. The invention is not limited to any particular shape, which can be recognized by person skilled in the art and descriptions thereof are omitted herein.

In summation of the description above, the rotary glasses of the present invention have one or more of the following advantages:

1. With the overall structural design of the rotary glasses according to the present invention, a user can longitudinally rotate the support portion of the glasses leg by using the pivot element as an axis in a direction away from the upper edge of the lens or the glasses frame when the user does not wear the rotary glasses of the invention. Therefore, the folding portion of the glasses leg and the lens or the glasses frame can support the rotary glasses at the same time such that the rotary glasses can be disposed on the disposing surface securely by the sufficient supporting force. Therefore, the rotary glasses of the present invention will not lose balance or topple over by a slight external force so as to prevent the lens or the glasses frame from damage.

2. The glasses leg of the rotary glasses of the present invention can be made of a material with high strength and toughness, and the overall structure design is adopted. Accordingly, the rotary glasses of the present invention can be more flexibly in used for different sizes of the users' head.

3. The rotary glasses of the present invention can be stacked with one another in a smaller storage space as shown in FIG. 4B so as to save the storage or transportation space.

What is claimed is:

1. A pair of rotary glasses, comprising:
at least one lens having a first pivotal transverse through hole formed on a non-upper edge of both left and right sides of the lens respectively;
at least one glasses leg including a support portion and a folding portion coupled with each other, and a second pivot portion disposed at an end of the support portion and corresponding to the first pivotal transverse through hole; and at least one pivot element, integrally formed with the glasses leg optionally, such that when the pivot element is not integrally formed with the glasses leg, the pivot element is transversely passed through the first pivotal transverse through hole and the second pivot portion to pivotally couple the lens and the glasses leg with each other, and when the pivot element is integrally formed with the glasses leg, the pivot element is transversely passed through the first pivotal transverse through hole to pivotally couple the glasses leg and the lens with each other;

wherein the pivot element acts as an axis such that the support portion of the glasses leg is rotated in a direction toward or away from an upper edge of the lens.

2. The rotary glasses of claim 1, wherein the lens is an integrally formed lens, and a nose rest portion is concavely formed at the middle of the lenses.

3. The rotary glasses of claim 1, wherein the first pivotal transverse through hole is formed at the middle of both left and right sides of the lens respectively.

4. The rotary glasses of claim 1, wherein the lens includes a recessed portion concavely and respectively formed on both left and right sides of the upper edge of the lens and provided for snapping in the support portion of the glasses leg.

5. The rotary glasses of claim 1, wherein the pivot element includes a snap portion and a latch portion disposed at an end of the pivot element, and the latch portion includes a recessed position and at least one snap member, and the snap portion is disposed at the recessed position, such that the snap member is aligned precisely with a side of the snap portion, and the snap portion is passed through the second pivot portion and the first pivotal transverse through hole and elastically protruded and latched to the external periphery of the first pivotal transverse through hole of the lens to pivotally couple the lens and the glasses leg with each other.

6. The rotary glasses of claim 1, wherein the lens includes a plurality of recessions disposed around and coupled to the first pivotal transverse through hole, and the glasses leg includes at least one protrusion having a shape corresponding to each of the recessions, and when the pivot element is passed through the second pivot portion and the first pivotal transverse through hole, the protrusion is snapped and latched into each of the recessions.

7. The rotary glasses of claim 1, wherein the support portion and the folding portion of the glasses leg are extended towards different directions to define an angle of intersection, and the support portion and the folding portion of the glasses leg are integrally formed.

8. A pair of rotary glasses, comprising:
a glasses frame, having a first pivotal transverse through hole formed on a non-upper edge of both left and right sides of the lens respectively;
at least one glasses leg including a support portion and a folding portion coupled with each other, and the support portion having a second pivot portion disposed at an end of the support portion and corresponding to the first pivotal transverse through hole; and
at least one pivot element, integrally formed the glasses leg optionally, such that when the pivot element is not integrally formed with the glasses leg, the pivot element transversally is passed through the first pivotal transverse through hole and the second pivot portion to pivotally couple the glasses frame and the glasses leg with each other, and when the pivot element and the glasses leg are integrally formed with each other, the pivot element transversally is passed through the first pivotal transverse through hole to pivotally couple the glasses leg and the glasses frame with each other;
wherein, the pivot element acts as an axis such that the support portion of the glasses leg is rotated in a direction toward or away from an upper edge of the glasses frame.

9. The rotary glasses of claim 8, wherein the glasses frame further includes the first pivotal transverse through hole formed at the middle of both left and right sides respectively, and a recessed portion concavely and respectively formed on both left and right sides of the upper edge of the glasses frame for snapping in the support portion of the glasses leg.

10. The rotary glasses of claim 8, wherein the glasses frame includes a plurality of recessions disposed around and coupled to the first pivotal transverse through hole, and the glasses leg includes at least one protrusion having a shape corresponding to each of the recessions, and when the pivot element is passed through the second pivot portion and the first pivotal transverse through hole, the protrusion is snapped into each of the recessions.

* * * * *